May 10, 1927.

H. F. SCHMIDT

LUBRICATING SYSTEM

Filed Jan. 24, 1924

1,627,750

WITNESSES:

H. F. Schmidt.
INVENTOR

BY D. C. Davis
ATTORNEY

Patented May 10, 1927.

1,627,750

UNITED STATES PATENT OFFICE.

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA.

LUBRICATING SYSTEM.

Application filed January 24, 1924. Serial No. 688,292.

My invention relates to lubricating systems, particularly to lubricating systems for turbines in which the lubricant is continuously recirculated, and it has for its object to provide apparatus of the character designated which shall operate continuously and reliably without care and attention for extended periods of time. It has for a further object to provide new and improved means for insuring at all times a positive supply of lubricant to the inlet of the circulating pump.

Figure 1:
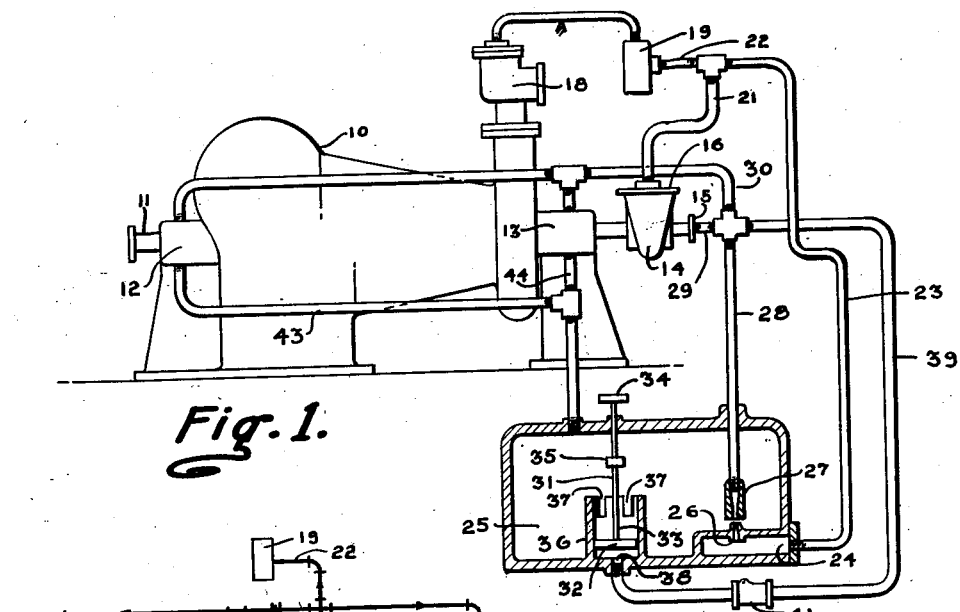
Figure 2:
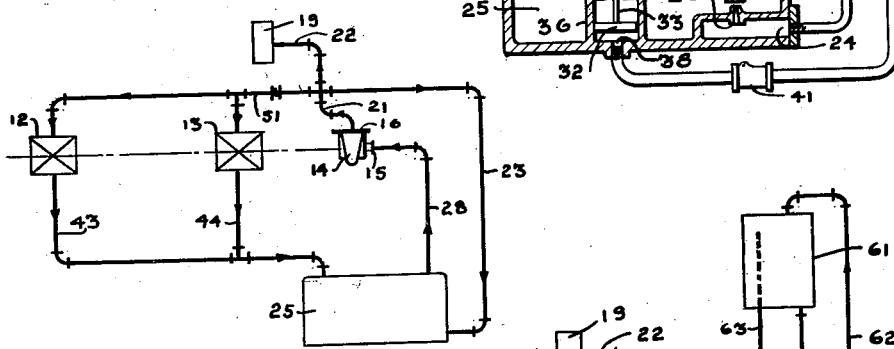
Figure 3:
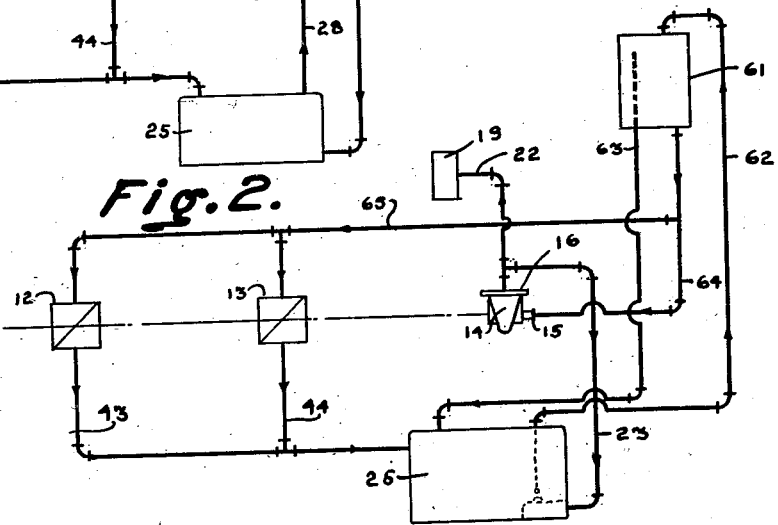

These and other objects, which will be made apparent throughout the further description of the invention, may be attained by the employment of the apparatus hereinafter described and illustrated in the accompanying drawing in which Fig. 1 is a diagrammatic illustration of a turbine oiling system arranged in accordance with my invention; Fig. 2 is a diagrammatic illustration of another form of turbine oiling system which is similar to that shown in Fig. 1 with the exception that the injector supplies oil to the pump only as the pump, and not the injector, supplies oil to the bearings and Fig. 3 is a diagrammatic illustration of still another form of turbine oiling system which is similar to that shown in Fig. 1 with the exception that the injector supplies oil to a gravity tank which in turn supplies oil to the pump and to the bearings.

Lubricating systems for fluid motors, such as steam turbines, generally include provision for reclaiming the oil upon its being discharged from the working parts of the machine, and they also provide for again circulating the reclaimed oil through the system. Normally, a reservoir is located at such distance below the working parts of the machine as will insure free drainage of the oil thereto. As the rotary pump for circulating the lubricant takes its supply from the reservoir, it is usual to so locate it as to provide a positive drainage head from the reservoir to the pump, and as the pump is generally driven from the turbine shaft, this location necessitates the interposition of numerous gears, drive shafts, etc., which complicated driving means have heretofore been frequently responsible for failure of the circulating pump to function properly.

As a means of improving the reliability of lubricating systems, resort has sometimes been made to a method in which the pump is directly driven by the turbine shaft and said pump is required to lift the oil from the drainage reservoir, located some distance below. This method is hazardous, however, inasmuch as the pumps employed are necessarily of the high-speed rotary type, and the possibility of failure of the suction pressure because of air binding or numerous other causes is ever present. It is no doubt readily appreciated that a failure of the lubricating system to function properly may cause serious damage to the turbine if the latter is not stopped instantly. Furthermore, where the lubricating oil pump is employed to generate pressure for a fluid-actuated governor, it is especially desirable that its reliability be of the highest order.

My system of lubrication considerably improves the reliability of lubricating devices. It is so arranged that, although the pump is directly driven by the turbine shaft and is located above the reservoir, a positive head of oil is maintained upon the inlet of the pump. I accomplish this result by providing an injector for raising the oil from the drainage reservoir to the pump, which injector is actuated by a quantity of the oil discharged under pressure by the circulating pump. Such an arrangement avoids the use of a complicated drive mechanism for the pump, allows the drainage reservoir to be disposed in its most advantageous location and provides means for positively raising the oil from the reservoir to the pump, which three features combine to produce a system of lubrication having the utmost reliability. Furthermore, my lubricating system is especially adapted for use with turbines having a governing mechanism which is actuated by oil at a pressure exceeding that of the oil supply to the bearings. Under conditions such as these, the circulating pump may be employed to maintain the higher pressure, that is, supply oil to the governor and motive oil to the injector, while the injector may be employed to maintain the lower pressure, that is, to supply the oil to the bearings.

Referring to the drawing for a more detailed description of my invention, I show a turbine 10 provided with a rotor shaft 11 and bearings 12 and 13. Driven by the rotor shaft 11 is an oil circulating pump 14 having an inlet connection 15 and a discharge connection 16. The turbine is provided with a motive fluid inlet valve 18 which is controlled by a governor 19 which is actuated by the oil pressure generated by the circulating pump. The discharge connection 16 of the circulating pump 14 communicates through conduits 21 and 22 with the governor 19 and through the conduit 21 and a conduit 23 with a pressure chamber 24 of an oil drainage reservoir 25. The pressure chamber 24 has provided therein an injector nozzle 26 which is so arranged as to receive a quantity of the fluid discharged by the circulating pump 14. Disposed within the drainage reservoir 25 and arranged in axial alignment with the nozzle 26 is a diffuser 27 which is located below the working level of the oil maintained in the reservoir. The diffuser 27 is adapted to receive as motive fluid the oil under pressure which is discharged by the injection nozzle 26. By means of a conduit 28 and branch conduits 29 and 30, lubricant discharged by the injector apparatus may be conveyed to the inlet connection 15 of the circulating pump and to the bearings 12 and 13.

For priming the system preparatory to starting the turbine, I provide a hand pump 31 which is of novel construction. The pump 31 is of the valveless type and, while involving very simple construction, has been found to operate very effectively. It comprises a piston 32 to which is secured a rod 33 provided with a handle 34 and a stop member 35 for limiting its upward travel. The piston 32 is disposed in a vertically-extending cylinder 36 which is provided in the lower portion of the drainage reservoir. The cylinder 36 has a plurality of inlet ports 37 and a discharge port 38. The inlet ports 37 are arranged at such a distance above the bottom of the drainage reservoir as to require the proper storage of oil in the reservoir preparatory to priming the system. This level is such as to immerse the inlet portion of the diffuser 27. The discharge port 38 of the hand pump 31 communicates, by means of a conduit 39, with the inlet connection 15 of the circulating pump. A check valve 41 is provided for preventing a return flow of the oil displaced by the pump.

The drainage reservoir 25 is located at such a distance below the turbine 10 as will insure free and rapid drainage thereto of the lubricant discharged by the working parts. I therefore provide conduits 43 and 44 for conveying the lubricant by gravity from the outlets of the bearings 12 and 13 to the reservoir.

The operation of my system of lubrication is as follows: Prior to starting the turbine, the piston 32 is manually raised to its uppermost position, thereupon allowing the oil in the reservoir 25 to flow through the inlet ports 37 into the cylinder 36, until such time as the space below the piston 32 is completely filled with oil. The piston is then moved downwardly and displaces the oil in the cylinder, which oil is conveyed by means of the conduits 39 and 29 to the inlet connection 15 of the circulating pump. A few such strokes are sufficient to prime the system, whereupon the turbine 10 may be operated and the circulating pump 14 discharges lubricant under pressure to the governor 19 and to the pressure chamber 24 of the drainage reservoir 25.

The oil in the pressure chamber 24 is discharged therefrom through the nozzle 26 into the diffuser 27 and entrains some of the oil in the reservoir 25. The oil is discharged upwardly through the conduits 28 and 29 to the inlet connection 15 of the circulating pump. In this manner, a positive supply of oil to the inlet of the pump is insured at all times coincident with its operation. Furthermore, because no moving parts are involved in the injector apparatus, and also because of the absence of complicated drive means for the circulating pump, the possibilities of failure of the oil supply are reduced to a minimum. A quantity of the oil discharged by the injector apparatus is further conveyed by the conduit 30 to the bearings 12 and 13 from which it drains by gravity through the conduits 43 and 44 to the drainage reservoir 25 from which it may again be circulated.

It may be readily appreciated from the above description, that my system of lubrication is especially adapted for use in installations wherein the maintenance of oil at two different pressures is desirable. For example, in the system illustrated on the drawing, it may be advisable to maintain an oil pressure at approximately 50 pounds per square inch upon the governor, while an oil pressure of about 5 pounds per square inch may be sufficient for the bearings. By the employment of my system of lubrication, the circulating pump may be readily employed to maintain the higher pressure while the injector may be designed to supply oil to the bearings at the lower pressure in addition to maintaining a positive head of oil upon the inlet of the circulating pump.

In Fig. 2 I illustrate a system of lubrication similar to that shown and described in relation to Fig. 1 except that the rotary pump 14 discharges oil through a conduit 51 to the bearings 12 and 13 in addition to supplying oil to the governor and to the injector apparatus. In this embodiment, the injector apparatus is employed solely to deliver oil under a positive pressure head to the inlet of the circulating pump 14.

In Fig. 3, I provide a gravity tank 61 which is continually supplied with oil from the drainage reservoir by the injector apparatus discharging through a conduit 62. An overflow conduit 63 is provided for draining excess oil to the reservoir 25. Oil is supplied from the gravity tank under static pressure through a conduit 64 to the inlet of the circulating pump 14 and through a conduit 65 to the bearings 12 and 13. The circulating pump 14 is employed to discharge oil through the conduits 22 and 23 to the governor and the injector apparatus respectively. The oil is drained from the bearings 12 and 13 to the reservoir in the usual manner.

While I have shown my invention in but three forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a liquid pressure system for a steam turbine having a part requiring liquid under pressure whenever the turbine is in operation, means for supplying liquid under pressure to said part including a centrifugal pump having its impeller directly connected to the turbine rotor to move as a unit therewith, a supply reservoir, and an injector located below said pump and motivated by liquid received from the discharge side of the pump for entraining liquid from the reservoir and for supplying both the entrained and motive liquid to the inlet of the pump.

2. In a lubricating system for a fluid motor having a rotor, the combination of a pump having an impeller directly connected to the rotor and operative as a unit therewith, an injector arranged below the pump, said pump and injector discharging lubricant to the motor, a reservoir for collecting lubricant drainage from the motor, means for feeding lubricant by gravity from the reservoir for entrainment by the injector, and means for supplying lubricant directly from the discharge side of the pump to serve as motive liquid for the injector.

3. In a lubricating system for a high-speed rotary prime mover having bearings to be lubricated, means for supplying lubricant to the bearings including a centrifugal pump having an impeller directly connected to the prime mover to move as a unit therewith for discharging lubricant at a relatively high pressure, a reservoir for collecting drainage from the bearings, an injector motivated by lubricant received from the high-pressure side of the pump for entraining lubricant from the reservoir, and a conduit for conducting both entrained and motive lubricant from the injector to the inlet of the pump.

4. The combination with a prime mover having a lubricating system and an oil pressure operated governor, of means for supplying oil under pressure to the system and to the governor including a centrifugal pump having its impeller directly connected to and operative as a unit with the rotary member of the prime mover and an injector located below the pump and motivated by oil under pressure received from the discharge side of the pump for entraining oil from a suitable source and for supplying entrained and motive oil to the inlet of the pump.

5. The combination with a steam turbine having a rotor and provided with bearings to be lubricated and a pressure responsive governor, of a centrifugal pump having its impeller directly connected to the rotor to move as a unit therewith for supplying lubricant under pressure to the governor, a lubricant supply reservoir, an injector motivated by lubricant received from the high-pressure side of the pump for entraining lubricant from the reservoir, and conduit means for conducting both entrained and motive lubricant to the bearings and to the inlet of the pump.

6. In a lubricating system for a fluid motor, the combination of a reservoir for collecting lubricant drainage from the motor, a pump driven by the motor shaft and discharging lubricant under pressure, an injector apparatus for raising the lubricant from the reservoir to the inlet of the pump, said injector employing as motive fluid a quantity of the lubricant discharged by the motor driven pump, means effective upon oil in the reservoir for priming the motor driven pump and manual means for operating the last-named means.

7. In a lubricating system for a fluid motor, the combination of a reservoir for collecting lubricant drainage from the motor, a pump driven by the motor shaft and discharging lubricant under pressure, an injector apparatus for raising the lubricant from the reservoir to the inlet of the pump, said injector employing as motive fluid a quantity of the lubricant discharged by the motor driven pump, and a manually operated pump within the reservoir for conveying lubricant from the latter to the system.

8. In a lubricating system for a fluid motor, the combination of a reservoir for collecting lubricant drainage from the motor, a pump driven by the motor shaft and discharging lubricant under pressure, an injector apparatus for raising the lubricant from the reservoir to the inlet of the pump, said injector employing as motive fluid a quantity of the lubricant discharged by the motor driven pump, and a manually operated pump for raising lubricant from the reservoir to the system, said manually-operated pump being so arranged with respect to the reservoir as to require the presence therein of a predetermined quantity of lubricant for establishing communication between the manually-operated pump and the system.

9. The combination with a prime mover having a rotary member and a liquid pressure operated governor, of means for supplying liquid under pressure to the governor including a centrifugal pump having its impeller directly connected to and operative as a unit with the rotary member of the prime mover and an injector motivated by liquid under pressure received from the discharge side of the pump for entraining liquid from a suitable source, and for supplying the mixture of entrained and motive liquid to the pump inlet.

10. The combination with a steam turbine having a rotor and provided with an oil pressure responsive governor, of means for supplying oil under pressure to the governor including a centrifugal pump having its impeller directly connected to the rotor to move as a unit therewith, an oil supply reservoir arranged below the pump, an injector arranged below the pump and the level of oil in the reservoir and motivated by oil received from the high-pressure side of the pump for entraining oil from the reservoir, and a conduit for conducting both entrained and motive oil to the pump inlet.

In testimony whereof, I have hereunto subscribed my name this 28th day of December, 1923.

HENRY F. SCHMIDT.